March 31, 1964 C. FLAMAND 3,126,718
SUPERSONIC AIRFRAME STRUCTURE
Filed March 3, 1961 4 Sheets-Sheet 1

March 31, 1964   C. FLAMAND   3,126,718
SUPERSONIC AIRFRAME STRUCTURE
Filed March 3, 1961   4 Sheets-Sheet 2

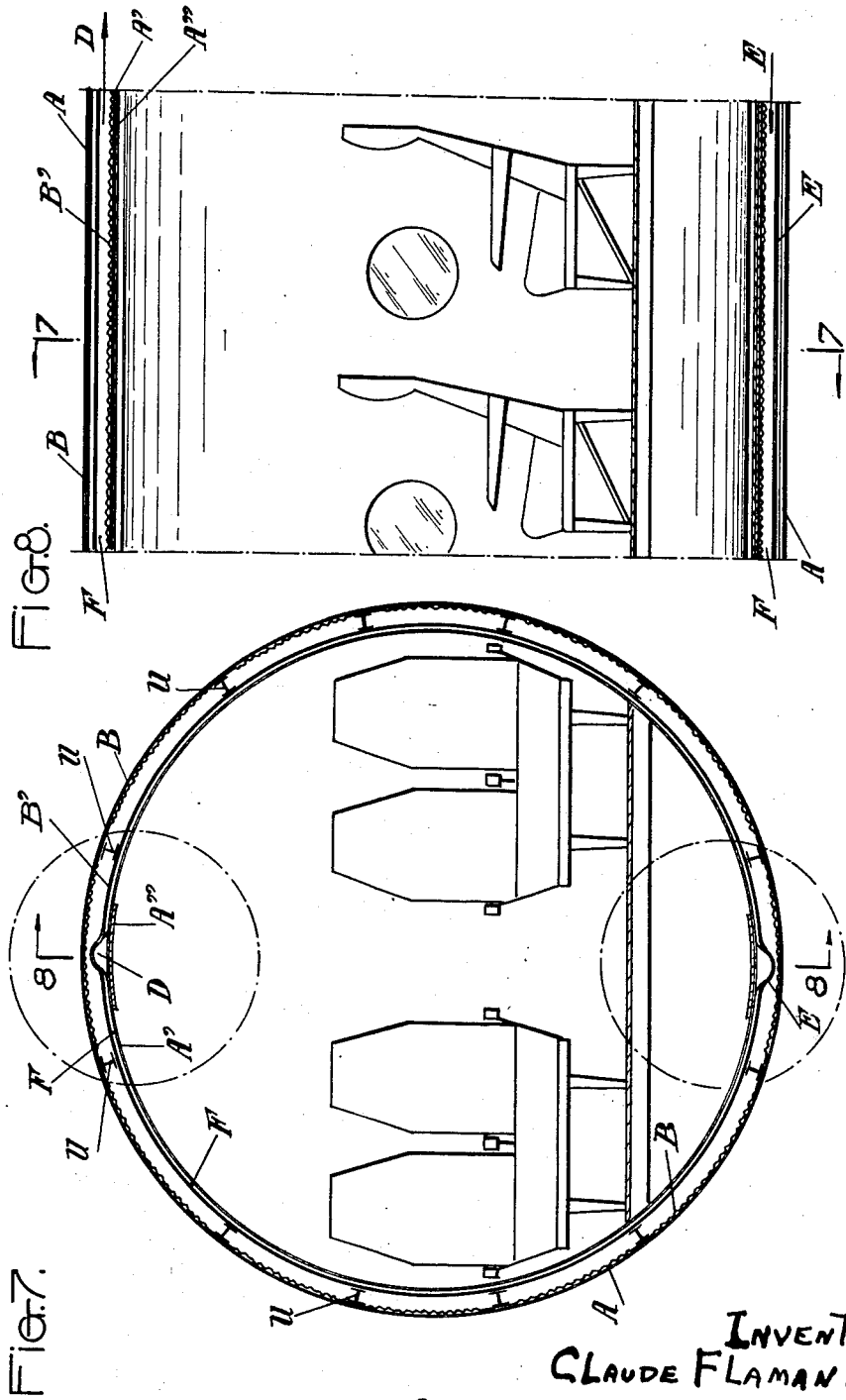

March 31, 1964   C. FLAMAND   3,126,718
SUPERSONIC AIRFRAME STRUCTURE
Filed March 3, 1961   4 Sheets-Sheet 4
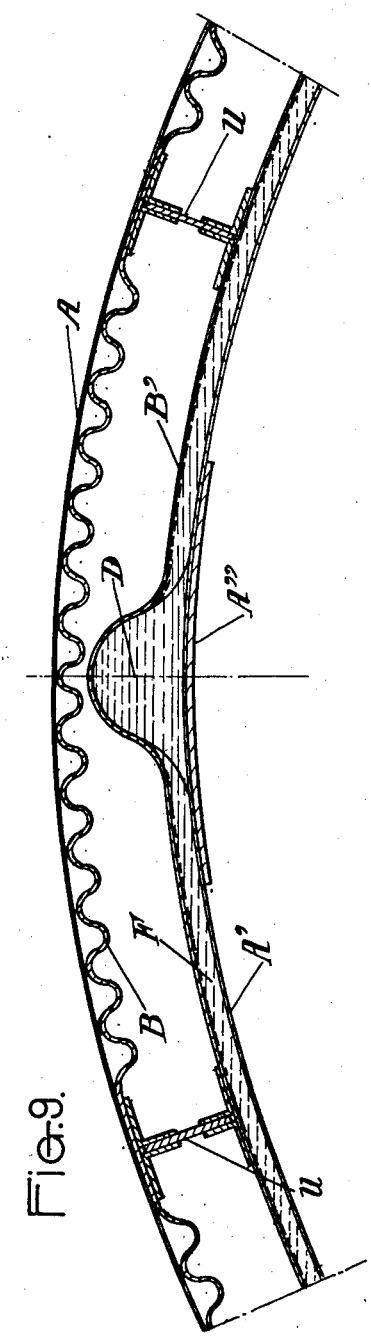
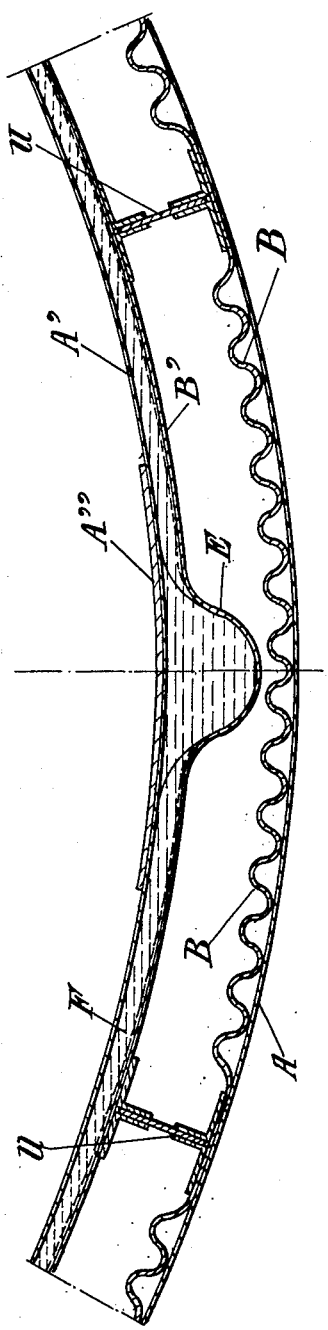
INVENTOR
CLAUDE FLAMAND
By
Mawhinney & Mawhinney
ATTORNEYS United States Patent Office 3,126,718
Patented Mar. 31, 1964

3,126,718
SUPERSONIC AIRFRAME STRUCTURE
Claude Flamand, Chatenay-Malabry, France, assignor to Nord-Aviation Societe Nationale de Constructions Aeronautiques, Paris, Seine, France, a joint-stock company of France
Filed Mar. 3, 1961, Ser. No. 93,056
Claims priority, application France Mar. 29, 1960
3 Claims. (Cl. 62—219)

The present invention relates to a device for the heat and sound insulation of supersonic aircraft structures.

Supersonic speeds lead, in practice, to the generation of intense noise and create adjacent the aircraft walls, a hot atmosphere whose temperature increases very rapidly with the Mach number.

This raising of the sound level and of the temperature results in:

A lowering of the structure's capacity to resist static and dynamic loads;

An increase of internal temperature and the creation of a noisy surrounding which is detrimental to both passengers and equipment;

Moreover, at the altitude at which supersonic flights can be made, there is the possibility of collision with micrometeorites which may damage the structure.

The object of the present invention is to substantially increase the mechanical strength of the wall at temperatures up to 500° C. and to provide at the same time a heat and sound screen.

The combined means for obtaining this double result are:

On the one hand, the combination of corrugated surfaces with smooth surfaces, thus forming channels;

On the other hand, the application to the above device of a cooling system by the circulation of fluid in the above channels.

Figure 1:
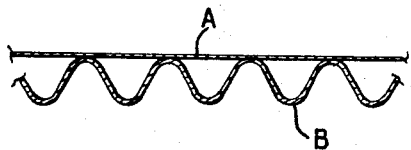
Figure 2:
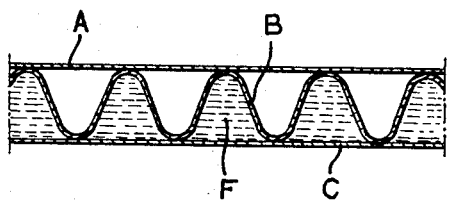
Figure 3:
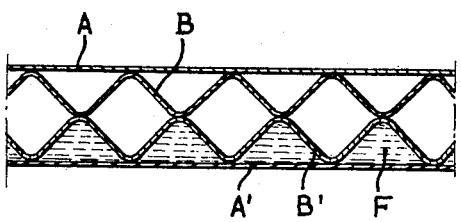
Figure 4:
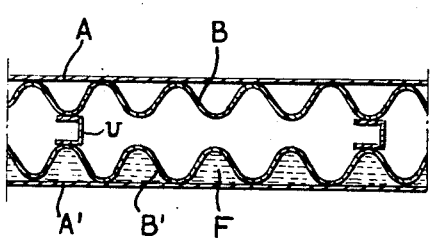
Figure 5:
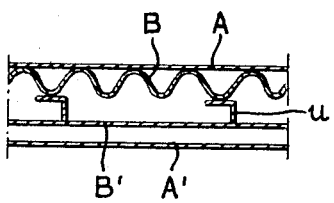
Figure 6:
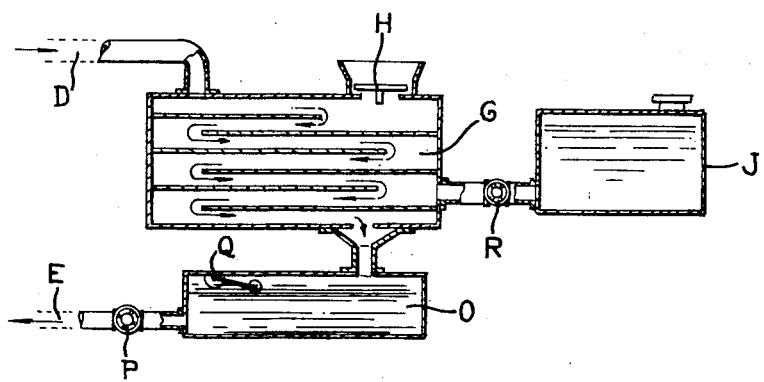

Further features and advantages of the present invention will become clear from the following description, presenting, with respect to the accompanying drawings, and merely by way of explanation without any intention of limitation, one embodiment of the insulation device in accordance with the invention. In these drawings FIGURES 1 to 10 represent, respectively:

FIGURE 1, the basic member;

FIGURE 2, the basic member mounted on a plane wall containing the circulating fluid;

FIGURES 3 and 4, alternative embodiments of the combination of the basic member or members with plane walls;

FIGURE 5, a modification of FIGURE 4;

FIGURE 6, the general diagram of the cooling device;

FIGURES 7 and 8, diagrammatic sectional views of the sealed cabin taken perpendicularly to its axis according to the line 7—7 of FIGURE 8 and along said axis according to the line 8—8 of FIGURE 7, respectively; and FIGURES 9 and 10 are enlarged sectional views showing details of construction of the device.

The basic member can be seen in FIGURE 1 and comprises the smooth plate A welded, for example electrically spot-welded, to a corrugated or honey-combed sheeting B.

In FIGURE 2, the basic member A—B can be seen, completed by a smooth sheet C electrically spot-welded to the corrugated sheeting B, so that A and C are on either side of B. In the corrugations of B there flows, as will be seen later, a cooling liquid F, this flow taking place within the corrugations closed by the smooth inner sheet C, the smooth sheet A separating them from the external surroundings.

In FIGURE 3 can be seen two basic members A—B and A'—B', assembled by electric spot-welding along the crests of their respective corrugations, so that the smooth sheets A and A' are located at the outside of the corrugations and the circulation of the cooling fluid taking place within the corrugations closed by sheet A', considering sheet A to be located at the outer side of the structure.

FIGURE 4 shows a modification of FIGURE 3, the members AB and A'B' being separated by a fixed distance and joined here and there by independent structural members U, the smooth sheet A being on the outer side and the smooth sheet A' on the inner side.

The circulation of cooling fluid F takes place within the corrugations of the basic member located on the inner side.

If desired, a light insulating body, such as glass-wool, can be packed into the free space between the members, which ensures, together with the fluid layer, very efficient sound insulation, particularly against high frequencies which are dangerous for the passengers, the crew, and delicate equipment.

FIGURE 5 shows a modification of FIGURE 4 wherein corrugations B' are at right angles to corrugations B.

In FIGURES 3, 4 and FIGURE 5, the inner basic member can have either its smooth sheet or its corrugated sheeting facing inwards.

It is to be noted that from FIGURE 2 to FIGURE 5 the embodiments become more and more complex, and as their complexity increases they provide better thermal protection within the aerodyne due to the increase in both number and volume of spaces containing insulating air. Each of these FIGURES 2 to 5 illustrates an embodiment of the principle of the invention.

In FIGURE 6, representing the general diagram of the cooling device, there can be seen, in vertical section:

A suction line D and a delivery line E on a circuit comprising a suction and delivery pump P, an evaporator G subjected to very low pressure approximating atmospheric pressure at high altitude, A calibrated valve H for exhausting the vapour produced into the atmosphere (this valve can be replaced by an extractor, consisting for instance of a vacuum pump; the aerodynamic pressure drop could also be used), a tank O for charging pump P (into which the cooled fluid returns), an auxiliary feed tank J controlled by valve R and level gauge Q.

The circuit is closed at the ends of pipes D and E through the distribution network for fluid F provided in the walls in accordance with one of the embodiments illustrated in FIGURES 3, 4 or 5.

FIGURES 7 and 8 are respectively a cross-section and a longitudinal section of the cabin, showing:

The suction and delivery lines D and E for the cooling fluid, which both extend into the network F;

The outer smooth and corrugated sheets A and B;

The corrugated sheeting B' and the smooth sheet A' according to the invention, the sheet A' being reinforced by gussets A''.

As can be seen more clearly in FIGURES 7, 9 and 10, the sheets A and B are held in spaced relation to the sheet B' by supports U' which are secured to the sheets B and B' as by welding or in any other suitable manner.

The operation is as follows: the cooling fluid flows in a closed circuit successively through the pump P, line E, network F, line D, the evaporator G, whence the vapour formed is exhausted to atmosphere due to the provision of said evaporator connected with the feeding tank J.

Owing to this circulation, the removal of heat passing through the upstream thermal barriers is ensured. The conditions of heat transfer from the external surroundings to the wall are such that the quantity of heat which passes through the wall becomes smaller as the temperature of this wall becomes higher and as this wall is itself a poor heat conductor.

Finally, this device enables, without any appreciable increase in weight relative to conventional structures, this wall to have substantial local rigidity and consequently it enables the local mechanical or thermal buckling strength on the one hand, and the behaviour of the unit to mechanical and sonic vibrations on the other hand, to be improved.

The invention is not exceeded in scope if equivalent means are used to provide a heat and sound insulating device, including the combination of smooth and corrugated surfaces forming channels therebetween in which a cooling fluid flows.

I claim:
1. Supersonic aerodyne airframe structure comprising
   (a) an external wall having mechanical resistance up to a predetermined temperature and providing heat and sound insulation in the direction outside to inside of the airframe,
   (b) an internal member defining the boundary of an accommodation compartment of the aerodyne capable of adsorbing any heat which passes through said external wall from outside the aerodyne,
   (c) an evacuating system for evacuating said heat absorbed by said internal member to the outside of the airframe, and
   (d) structural members located between said external wall and said internal members for rigidly maintaining the relative spacing of said wall and said internal members, thereby forming an intermediate chamber to receive any meteorites which may penetrate said external wall and thereby protect the aerodyne as a whole,
   (e) said internal member and external wall being tube-shaped and coaxial with one another, said internal member comprising
   (f) an inner smooth sheet material and an outer corrugated sheet material in mutual contact,
   (g) the crests of the corrugations of said corrugated sheet material in contact with said smooth sheet material being spot welded to said smooth sheet material,
   (h) the plane of each crest being perpendicular to the axis of said internal member and wall,
   (i) a pair of collectors located against the external surface of said internal member in positions diametrically opposed to each other,
   (j) the axes of said collectors being parallel to the common axis of said internal member and external wall,
   (k) the compartments formed between the corrugations of said outer sheet material and said inner smooth sheet material communicating directly with each said collector.
   (l) a cooling liquid circulated through said compartments and said collectors whereby the lowermost collector when said aerodyne is in a position for normal horizontal flight constitutes the collector for admission of said cooling liquid and the uppermost collector when said aerodyne is in a position for normal horizontal flight constitutes the discharge collector for said cooling liquid.
2. Supersonic aerodyne airframe structure as claimed in claim 1, wherein said evacuating system comprises
   (m) an evaporator,
   (n) a reservoir,
   (o) the evaporator is connected to said reservoir,
   (p) a delivery pipe,
   (q) a pump is mounted on said delivery pipe,
   (r) said delivery pipe connects said reservoir to said lowermost collector,
   (s) a discharge pipe connects said evaporator to said uppermost collector,
   (t) a calibrated valve is on said evaporator,
   (u) an additional supply tank is connected to said evaporator,
   (v) a tap is between said evaporator and said tank,
   (w) a level gauge is in said reservoir adapted to control said tap.
3. Supersonic aerodyne airframe structure according to claim 2 wherein said cooling liquid is water.

References Cited in the file of this patent
UNITED STATES PATENTS

| | | |
|---|---|---|
| 2,436,389 | Kleist | Feb. 24, 1948 |
| 2,540,331 | Hlavaty | Feb. 6, 1951 |
| 2,690,653 | Kleist | Oct. 5, 1954 |
| 3,013,641 | Compton | Dec. 19, 1961 |